United States Patent [19]

Liversidge

[11] Patent Number: 4,640,009
[45] Date of Patent: Feb. 3, 1987

[54] CO-AXIAL CABLE STRIPPING TOOL AND END PORTION PREPARATION METHOD

[76] Inventor: Barry P. Liversidge, 9 Heather Close, Layer-de-la-Haye, Colchester, Essex, England

[21] Appl. No.: 770,870
[22] PCT Filed: Jan. 18, 1985
[86] PCT No.: PCT/GB85/00024
    § 371 Date: Aug. 23, 1985
    § 102(e) Date: Aug. 23, 1985
[87] PCT Pub. No.: WO85/03389
    PCT Pub. Date: Aug. 1, 1985

[30] Foreign Application Priority Data

Jan. 20, 1984 [GB] United Kingdom ............... 8401513
May 25, 1984 [GB] United Kingdom ............... 8413445

[51] Int. Cl.⁴ ............... H01B 13/20; B26B 27/00
[52] U.S. Cl. ............... 29/828; 30/90.1; 30/90.8; 81/9.44; 81/9.51
[58] Field of Search ............... 29/828; 81/9.51, 9.44; 30/91.2, 90.8, 90.1

[56] References Cited

U.S. PATENT DOCUMENTS 3,486,216 12/1969 Cimolino ............... 29/828
3,614,905 10/1971 Bieganski ............... 81/9.51
4,130,031 12/1978 Wiener et al. ............... 30/91.2
4,366,619 6/1983 Bieganski ............... 30/90.1
4,526,068 7/1985 Undin et al. ............... 30/90.1 X Primary Examiner—Howard N. Goldberg
Assistant Examiner—Carl J. Arbes
Attorney, Agent, or Firm—Edward R. Weingram

[57] ABSTRACT

A tool for preparing the end portion of a co-axial cable has a blade which may pivot between two limiting positions, in one of which the cutting edge of the blade lies across a cable-receiving opening to a greater extent than in the other of which positions. On inserting a co-axial cable through the opening and rotating the tool around the cable in one sense, the blade is caused to move to one limiting position so effecting one depth of cut, but on rotating the tool in the other sense around the cable, the blade is caused to move to the other limiting position so effecting a different depth of cut. In this way, the different layers of the cable may be severed and removed. In the method, a first cut, for example with the tool described above, is made around the co-axial cable to a depth sufficient partially to sever the insulating layer overlying the cable core: the partially severed portion is twisted around the cable core totally to separate all layers overlying the core; a second cut is made further from the cable end to precisely the same depth as the first cut; and a third, relatively shallow cut is made yet further from the cable end, this time just to sever the outer layer. An axial pull then successfully exposes the cable core, inner insulator and outer conductor.

11 Claims, 11 Drawing Figures

CO-AXIAL CABLE STRIPPING TOOL AND END PORTION PREPARATION METHOD

This invention relates to a tool suitable for preparing the end portion of an elongate member having a core and at least three layers therearound, by stripping the layers back to expose the core and other layers from the end of the member. The invention further relates to a method for preparing the end portion of such a member. In particular, but not exclusively, the invention relates to a tool specifically intended to assist the preparation of the end portion of an electric co-axial cable to permit the electrical termination thereof, for example by a jointing technique or by the attachment thereto of a co-axial cable connector, and also relates to a method specifically intended to prepare such an electric co-axial cable, successively to expose the core and overlying layers, from the end of the member.

Though the tool and method of this invention may be used to strip layers from multi-layered elongate members other than electric co-axial cables, it will in the following be described with specific reference to electric co-axial cables. However, it will be appreciated that the tool and method does have other applications—for instance, the preparation of end portions of fibre optic cables—and the term "co-axial cable" as used herein should be construed accordingly.

A typical electric co-axial cable has three layers around a central conducting core—namely, an insulating first layer, a conducting second layer and an insulating third layer or outer sheath. Any of these layers may be formed as a group of two or more distinct sub-layers—for example, the conducting second layer may comprise a first sub-layer of copper foil wrapped around the insulating first layer and a second sub-layer of braided copper strands laid over the copper foil; and the insulating third layer may comprise two or more sub-layers in order to impart to the completed cable the required electrical and mechanical properties. The invention is of course applicable to such multi-layered cables, and a reference hereinafter to any particular layer of a cable is intended to apply equally to a group of layers, where such a group serves the function of a single layer and so should be removed as a single layer when preparing the end portion of the cable.

The stripping of the end portion of an electric co-axial cable to prepare it ready for termination presents considerably greater problems than those encountered in preparing a conventional single conductor wire. In a manufacturing concern, such problems may be overcome by appropriate automated machinery which is both complex and relatively expensive. However, for on-site installation of co-axial cables, or for relatively small scale users of such cables, the use of automated machinery is not appropriate and the preparation of an end portion of a co-axial cable can present certain problems. The usual manual method of preparing the end portion of a co-axial cable is by using a sharp hand-held knife—and with some experience, an operator may prepare the end portion of a co-axial cable with complete satisfaction. This action may be assisted with a wire stripper, perhaps especially adapted to the cable to be prepared. Nevertheless, the preparation of the cable still takes some considerable time, and quite often the conductors are accidentally "nicked" by the knife being used to remove the insulation. Also, the operator may inflict a serious wound on himself, by using an open sharp knife blade to perform the actions firstly of removing a relatively long length of outer insulation from the co-axial cable, and subsequently removing a shorter length of outer conductor and inner insulator.

It is a primary object of this invention to provide a tool suitable for preparing the end portion of an elongate multi-layer member and specifically an electric co-axial cable, which tool is very simple to use and yet is able reliably and consistently to cut selectively through either only an outer layer (e.g. the outer insulating layer of a co-axial cable) or more than just the outer layer (e.g. the outer insulating layer, the outer conductor and the inner insulating layer of a co-axial cable, without also cutting the inner conductor).

According to a first aspect of this invention, there is provided a tool suitable for stripping distinct layers from a multi-layer elongate member, which tool comprises a body defining an opening in which may be received the member to be stripped, and a cutting blade pivotally mounted with respect to the body and movable between the two limiting positions in the first of which the cutting edge of the blade projects to a relatively large extent into the opening and in the second of which the cutting edge projects to a relatively lesser extent into the opening, whereby following the location of a multi-layer member in the opening and rotating the tool around the member in one sense, the blade is caused to move to one limiting position such that the cutting edge substantially severs several layers of the member, but on rotating the tool around the member in the other sense the cutting blade is caused automatically to move to its other limiting position such that the cutting edge severs fewer layers of the member.

The following further description of this invention will refer exclusively to electric co-axial cables, though it will be appreciated that many of the preferred features are applicable to tools intended for use with other elongate multi-layer members.

When the tool of this invention is to be used with a co-axial cable, it must specifically be designed to match the cable configuration—but since such cables come in a relatively few number of sizes, this need not present a significant disadvantage. The arrangement of the tool is such that when it is desired to expose the inner conductor of a co-axial cable, the tool is suitably positioned on the cable and is rotated therearound in one sense, whereby frictional drag on the blade causes the blade to move to its first limiting position so severing all the layers over the core conductor though the layer immediately overlying the core may only partially be severed, radially. Then the tool is again suitably positioned on the cable at the point where the outer conductor is to be exposed, and the tool is moved therearound in the opposite sense, so causing the blade to move to its other position where the cutting edge severs only the outer insulating layer. Stripping of the severed layers may thereafter easily be accomplished.

Configuring the tool to suit a particular cable enables the tool to be used successively to expose the core and each overlying layer of the cable even though the tool effects only two different depths of cut. This is obtained by having the deeper cut only partially severing the insulating first layer of the cable, over the core. To do this, a first deep cut is made adjacent the end of the cable by rotating the tool around the cable in the appropriate sense, whereafter the severed outer layers are rotated around the core with respect to the remainder of the cable, so completely separating the first layer whilst leaving the core intact. The tool is then moved further on the cable and a second deep cut made, but the outer layers are not subsequently rotated around the core. Next the tool is moved yet further on the cable and a third cut made, but this time by rotating the tool in the opposite sense so causing the blade to move to its other position and so effecting a shallow cut through the outer layer only. Preparation is completed by pulling the tool off the cable whilst leaving the blade in the third cut, which action slides the severed layers off the end portion of the cable, so successively exposing the conducting second layer, the first insulating layer and the conducting core.

In view of the foregoing, it is a second object of this invention to provide a method for the preparation of the end portion of a co-axial cable which method can be performed by a simple device but which method permits adequate cutting of the layers to enable the removal thereof, without risk of damage to the core.

Accordingly, a second aspect of this invention provides a method for preparing the end portion of an elongate member having a core and at least three co-axial layers therearound so as successively to expose the core and layers from the end of the member, which method comprises:

(a) effecting a first cut around the member at a position adjacent but spaced from the end of the member to a depth sufficient partially to sever the layer immediately overlying the core;

(b) twisting the so-severed layers around the core so as to complete separation of the end portion of the layer immediately overlying the core from the major portion thereof;

(c) effecting a second cut around the member at a position spaced further from the end of the member than the first cut and to the same depth as was effected the first cut;

(d) effecting a third cut around the member at a position spaced further from the end of the member than the second cut but to a lesser depth sufficient at least partially to sever the third layer overlying the second layer but not to sever that second layer;

(e) applying axially of the member and in the direction of the end thereof a force to the severed portion of the third layer at or immediately adjacent the third cut thereby to strip from the member successively from the third cut the third layer, the second layer and the first layer, so leaving an exposed length of the core at the end of the member.

In performing the method of this invention, it will be appreciated that though three cuts are made around the cable, two cuts (the first and second cuts) are made to the same depth, and so a tool designed to perform this method may be much simplified in that it has to be capable of effecting only two different depths of cut. Moreover, by only partially severing the first layer with both the first and second cuts, there is no risk of damage to the central core by the cutting blade, and so cables manufactured with even relatively poor concentric tolerances can successfully be prepared by this method.

Preferably, the cutting blade of the tool of this invention is pivotally mounted on a carrier itself slidably mounted with respect to the body, whereby the blade may be moved clear of the opening by sliding movement of the carrier so facilitating the insertion of a cable into the opening. For such an arrangement, the opening may be in the form of a through-bore, in which the cable may be received. Advantageously, a resilient bias is provided between the carrier and body, to urge the blade towards the opening. This enables the blade progressively to penetrate the cable to the required depth as the tool is rotated around the cable.

The blade conveniently has a mounting hole by means of which the blade is pivoted to a pin provided on the tool body (or carrier, if provided). The blade may then have a second hole, preferably in the form of an elongate slot, through which a second pin passes with clearance, the pivoting movement of the blade being limited by interengagement of one or the other sides of the second hole with the second pin.

Preferably the tool includes guide means assisting the positioning of the tool with respect to a cable. Such guide means may comprise a projection from the tool body adjacent the opening and having graduations or other indexes for alignment with the cable end or an annular cut already formed therein.

In an alternative form of the tool, the cutting blade may be set relative to the body at a slight angle to a strict radial plane of a cable located in the opening, whereby rotation of the tool around the co-axial cable in the sense causing the blade to effect a shallow cut causes the body to be threaded along the cable, whilst at the same time at least partially severing the outer insulating layer. The severed outer layer thus is in the form of a helicoid, at the completion of the severing operation, and may with great facility be removed from the cable simply by pulling the free end portion of the helicoid in an axial direction. Rotation of the tool in the other sense around the cable, to sever all of the layers except the inner core, should not cause axial movement of the tool along the length of the cable, in view of the considerably great depth of penetration of the cutting blade.

The body of the tool may suitably be profiled to lend itself to the ready rotation thereof around a co-axial cable. For example, the body or the blade carrier (if provided) may include a rounded finger hole. In an alternative arrangement, the blade may be pivoted directly to the body and be appropriately profiled to permit the application of a force thereto to drive the blade—and hence the body—around the co-axial cable to be prepared. In such a case the same severing action can be obtained, because the body will tend to trail behind the rotation of the blade, owing to the friction between the body and the cable, so following the rotation of the blade in whichever sense a rotative force is given to the blade.

The method of this invention as described above stems from the realisation that the first layer over the core, when partially severed by a radial cut therearound, can thereafter be completely separated from the major part of that layer by twisting the partially-severed portion about the core, so permitting the subsequent removal of that layer, or can be left to remain connected to the major part of that layer, if subjected just to an axial force through the overlying layers. The depth of cut required to achieve reliable separation on twisting, but sufficient strength to hold the partially-severed portion to the major part when axial force alone is applied, depends upon the particular materials of the cable as well as the dimensions of the cable, but tests have shown the cut should sever the first layer to a depth in the range of from 20% to 50% of the first layer thickness, and preferably about 30% of that thickness.

The depth of the third cut should be great enough to sever the third layer to an extent sufficient to ensure that layer will separate on applying an axial force to that layer, but it is preferred for the third cut to stop short of the conducting second layer, to avoid risk of "nicking" that layer. This third layer may thus be severed to a depth of from 60% to 90% of that layer thickness, but preferably to a depth of about 75% of the layer thickness, to ensure the second layer is not affected by the cut, even with cables constructed with relatively low concentricity tolerances.

In the foregoing description of the method of this invention, all the severed layers are removed at the same time in the final stage of the method. It will however be apparent that the method may be performed in such a way that the end portion of the layer immediately overlying the core may be removed from the cable at the completion of the second stage in which that end portion is separated by twisting, following performance of the first cut. Then, in the final stage of the method, only the layers severed by way of the second and third cuts would be removed.

The method of this invention need not be performed with the tool described above, having a pivoted blade, though it does not lend itself to performance by simple hand tools such as a knife. For example, all that is required is a tool which includes a blade adjustable with respect to a reference surface for the cable to be cut to give the two required depths of cut. Such a tool may have a body defining a bore through which the cable is passed, there being a blade slidably mounted on the body and having an adjustment mechanism serving to permit the blade to be moved from a base position where it is clear of the bore to a first position giving a relatively shallow cut to a second position giving a deeper cut.

Whichever tool is employed, it is preferred for the blade of the tool to be employed to impart the force required to remove the separated layers, before the blade is removed from the third cut. Thus, following completion of the third cut, but before withdrawal of the blade from that cut, a force should be applied to the tool axially of the cable and in the direction of the free end of the cable. The tool itself may also apply a clamping force to the severed layers immediately adjacent the third cut, so assisting removal of the layers. In this way, the severed layers may be removed, so exposing successively from the third cut towards the free end the second layer, the first layer and the core.

Most conveniently, the tool is configured to provide a guide for the positioning of the cuts. This may be achieved by a graduated projection, enabling the operator to determine exactly where to position the cable with respect to the tool, prior to effecting a cut.

By way of example only, one specific embodiment of co-axial cable stripping tool constructed in accordance with this invention and a stripping method also in accordance with this invention along with a further tool therefor all will now be described in detail, reference being made to the accompanying drawings, in which.

Figure 5:
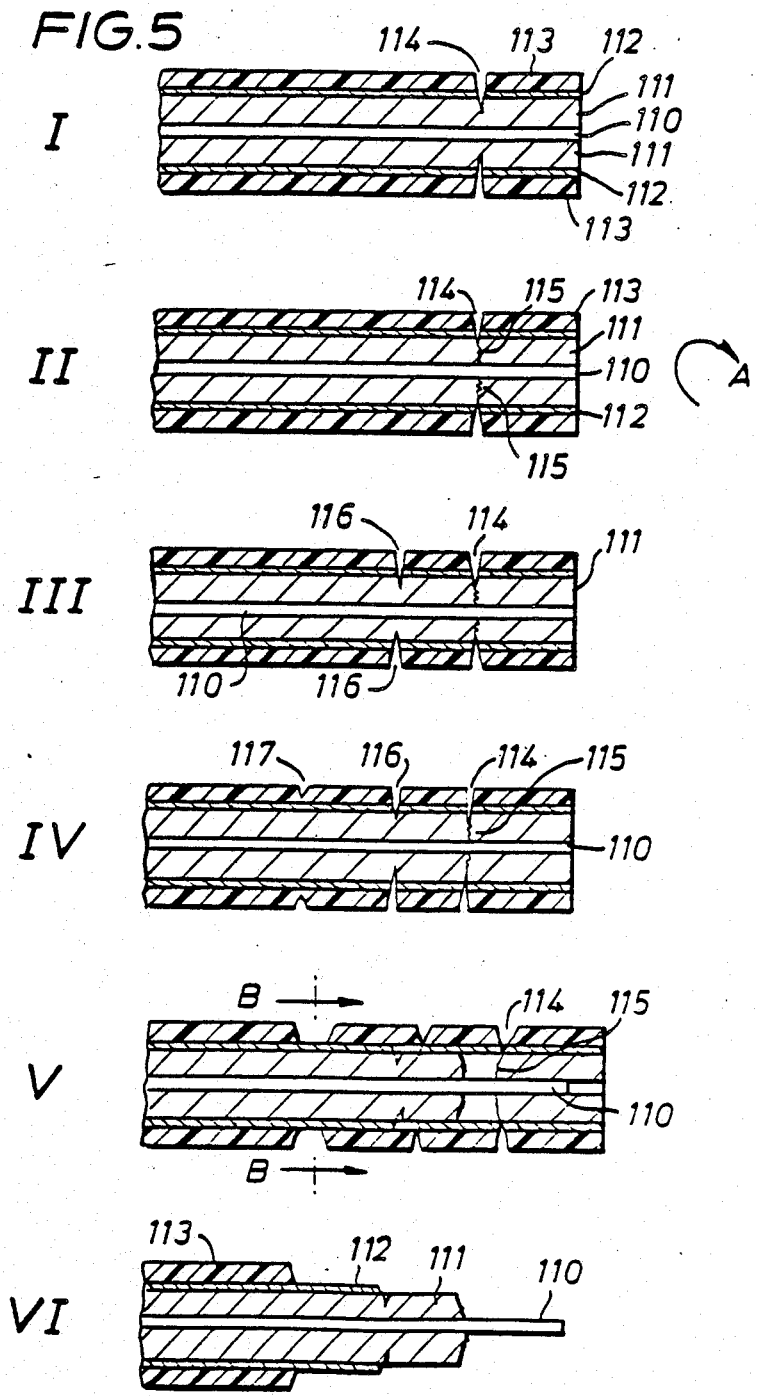
Figure 6:
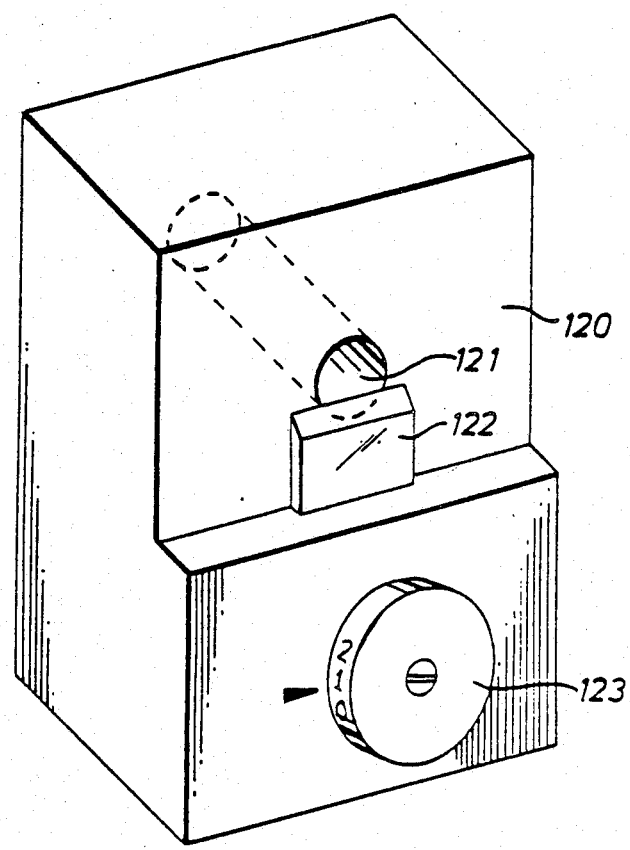

FIGS. 5-I to 5-VI show the five steps of the method of this invention, as employed to prepare the end portion of an electric co-axial cable and the finished cable; and FIG. 6 is a diagrammatic perspective view of a hand tool suitable for performing the method of the invention of FIGS. 5-I to 5-V.

Referring initially to FIGS. 1 to 4, the cable stripping tool there shown has a body 10, assembled from three moulded plastics material parts comprising a main body 11, a cover plate 12 and a blade carrier 13. The main body 11 and cover plate 12 fit together to define a slot within which a portion of the blade carrier 13 may slide, as will be apparent from the following description.

The main body 11 has a side plate 14 from which a generally U-shaped wall 15 upstands, leaving a flange 16 projecting beyond the U-shaped wall. In association with the side plate 14, the inner faces of the wall 15 define the slot 17 within which a generally rectangular portion of the blade carrier 13 may slide. The moulding of the main body 11 may include recesses 18, to reduce the amount of plastics material employed and also to permit satisfactory production of the part by an injection moulding process, taking into account material shrinkage.

The cover plate 12 is of substantially the same overall shape as the side plate 14, and has a flange 19 arranged in a similar manner to the flange 16 of the main body 11. Five pins 20 project normally from the cover plate, which pins are received in bores 21 provided in the main body, to locate and hold the cover plate in the required position with respect to the main body 11. Pins 20 and bores 21 may appropriately be formed so that the main body and cover plate snap-fit together, or reliance may be placed simply on a frictional interfit between the pins and bores. Alternatively, the cover plate and main body may be glued together during the last stage of assembly of the tool.

A bore 22 is formed through the side plate 14, which bore is of an appropriate diameter closely to receive the co-axial cable with which the tool is intended to be used. The inside face 23 of the base of the U-shaped wall 15 extends substantially diametrically of the bore 22, and that wall is provided with a semi-circular groove 24 contiguous with the bore 22, so as to permit a cable to be inserted through the bore 22 to the required extent. The cover plate 12 similarly is formed with a bore 25 co-axial with and of the same diameter as the bore 22, and on the outer face of the cover plate adjacent the bore 25 there is provided a guide piece 26, having two guide surfaces 27 and 28, for a purpose to be described below.

The blade carrier 13 has a finger portion 29 including a finger hole 30 and a moulding recess 31 in which may be provided for example information concerning the particular sizing of the tool. Projecting from the finger portion 29 is a blade portion 32, adapted for sliding movement within the slot 17 defined by the main body 11. The top face 33 of this portion 32 is provided with a semi-circular groove 34, centrally positioned for alignment with the bore 22 in the main body 11.

The blade portion 32 of the blade carrier 13 is provided with two pins 35 and 36 upstanding from that portion and having a cutting blade 37 pivotally mounted on pin 35. In addition to the hole adjacent the blade end remote from the cutting edge 38 closely fitting on the pin 35, the blade has a slot 39 in which is received pin 36. When so positioned, the cutting edge 38 of the blade is cordal with respect to the groove 34.

The blade 37 is of closely controlled dimensions and shape. The side edge of slot 39 is tangential to the hole for pin 35 and the cutting edge 38 is accurately honed to lie at a predetermined acute angle to the major axis of the slot 39, a known distance from the hole which receives the pin 35. In addition, the relative positions of the pins 35 and 36 with respect to the groove 34 of the carrier 13 are closely controlled.

Figure 3:
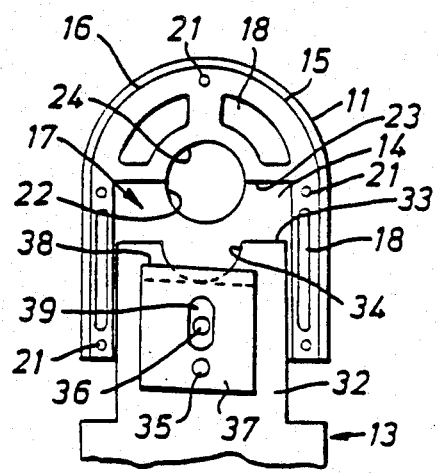
FIG. 3 is a detailed part-view of the tool of FIGS. 1 and 2, showing the cutting blade in a first position.
Figure 4:
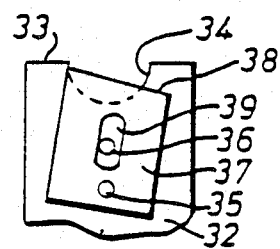
FIG. 4 is a detailed view of the cutting blade, but in its second position.

It will thus be appreciated that with the blade pivoted to the position shown in FIG. 3, with the pin 36 engaging the right-hand edge of the slot 39, the amount by which the cutting edge 33 overlies the groove 34 can be controlled by appropriate positioning of the pin 35. When the blade has pivoted so that the left hand side of the slot 39 engages the pin 36 (as shown in FIG. 4) the amount by which the cutting edge 38 overlies the groove 34 is increased, but limited by the spacing between the pins 35 and 36. Thus, complete control of the two depths of cut, with the blade in the two positions shown in FIGS. 3 and 4 respectively, can be achieved solely by appropriate positioning of the pins 35 and 36.

Figure 2:
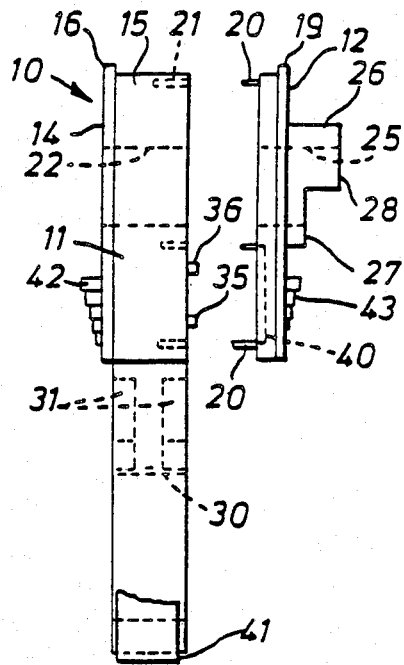
FIG. 2 is a side view of the tool of FIG. 1 but with its cover plate separated from the main body and the elastic band partially cut away, for clarity.

As shown in FIG. 2, the pins 35 and 36 project beyond the U-shaped wall 15 of the main body 11 to be received in a groove 40 in the cover plate 12. When the tool is completely assembled, this groove 40 limits the movement of the blade carrier 13 away from the main body 11.

The tool is completed by means of a resilient endless band 41 passed around the U-shaped wall 15, between the flanges 16 and 19, and around the finger portion 29 of the blade carrier 13. When so positioned, the band 41 should be in a state of tension, so that it holds the blade carrier 13 fully engaged in the slot in the main body 11. To facilitate relative separation of the blade carrier and the main body 11 to the extent limited by pin 35 in groove 40, finger and thumb friction grip portions 42 and 43 are provided respectively on the side plate 14 and cover plate 12.

The above described tool is especially configured for use with a particular co-axial cable, to give a specified form of end portion preparation. When a cable of the correct type is to be prepared, the tool is "opened" by pulling the blade carrier 13 away from the main body 11 against the resilient bias provided by the band 41, conveniently effected by inserting the middle finger through finger hole 30 and grasping the body between a thumb and forefinger, on grips 42 and 43. Holding the tool open, the operator then pushes the cable through bore 22, past grooves 24 and 34 and through bore 25 in plate 12, to project beyond face 28. The tool is then released to permit the band to draw the blade carrier 13 into the main body, whereafter the tool is rotated in a clockwise sense (as viewed in FIG. 1 with the cable end-on). The drag of the blade on severing the layers of the cable causes the blade to move to the position illustrated in FIG. 4 and so the blade effects a relatively deep cut, partially severing the insulating first layer overlying the core of the cable.

The tool is then opened again, and the cable pushed further through the bore until the cut already effected is aligned with guide surface 27 of the guide piece. Then, the projecting portion of the cable is twisted, until little resistance is felt, so indicating that the end portion of the insulating first layer of the cable has been completely severed. This action also will twist together the strands of a multi-strand core conductor. The tool is then rotated clockwise again, so effecting a second cut partially severing the insulating first layer of the cable, the blade acting in precisely the same manner as has been described above. Preferably, the tool is at this point rotated sufficiently counter clockwise to move the blade to the position illustrated in FIG. 3, to prevent the blade cutting right through the insulating third layer in the initial part of the next stage, described below.

In the next stage of the operation, the tool is opened again and the cable pushed yet further through the bore in the tool, until the second cut is aligned with the second guide surface 28 of the guide piece 26. It is then rotated in a counterclockwise direction automatically to maintain the blade in the position illustrated in FIG. 3, so performing a relatively shallow depth of cut, severing on the outer insulating third layer of the cable and leaving untouched the conducting second layer and the insulating first layer. To complete the preparation, the tool is gripped across its ends, so urging the recesses 24 and 34 to clamp on to the severed part of the cable, and the tool is then pulled towards the free end of the cable, the blade still being engaged in the third cut. This pulls all of the severed layers clear of the cable, so leaving exposed a portion of the inner conductor, a length of the insulating first layer and a length of the conducting second layer.

When using the tool of this invention, it will be appreciated that the blade need not immediately penetrate the cable to the required depth. The severing action may be gradual, as the tool is rotated, with the band 41 gradually drawing the blade into the cable to the predetermined depth, as tool rotation is continued. Moreover, the operation of the tool is fully automatic in that the blade moves to either one of its two positions by virtue of the drag of the blade through the cable, depending on whether the tool is rotated clockwise or counterclockwise.

Modification of the tool to suit different cables is relatively simple. Identical mouldings may be used, with the bores 22 and 25, and the grooves 24 and 34 appropriately machined to suit the cable with which the tool is to be used. Moreover, the holes in the carrier to receive the pins 35 and 36 may be jig-drilled at appropriate positions to give the required two depths of cut for any given cable.

The tool also may be modified to have the blade carrier removable from the body, by appropriate configuration of pins 35 and 36, and of the plate 12 in the region of slot 40. This will facilitate the changing of a blade, when blunted by repeated use. Spare blades may be carried in an appropriate recess, formed in the blade carrier for instance on the opposite face thereof to that from which pins 35 and 36 project.

In a further alternative, the blade carrier 13 may include a slidable jaw opposed to and spring-urged towards recess 24 in the body. This jaw will engage the cable immediately on releasing the blade carrier, even though the blade may not have penetrated the cable so preventing the recess 34 engaging the cable. Such a jaw will serve to clamp the cable against recess 24, and also to hold the tool square, until the blade has sufficiently penetrated the cable on rotating the tool.

The method of using the tool described above will now be explained in greater detail, referring to FIGS. 5-I to 5-VI. Shown in those Figures is a cable to be stripped, comprising a copper conducting core 110, which may be a monofilament or multi-stranded, surrounded by a first layer 111 of an appropriate dielectric material, having regard to the intended use for the cable. The first layer 111 may comprise a solid sleeve for instance of polyethylene, or it may be of the air-cored variety. Closely overlying the first layer 111 is a conducting second layer 112, typically formed of a copper braid in the form of a sleeve. Again, having regard to the intended use of the cable, the second layer 112 may comprise two sub-layers, the first of which being a copper foil wound tightly around the first layer 111 and the second of which being a braided copper sleeve. The cable further comprises a third layer 13, in the form of an insulating sleeve made from an appropriate plastics material. This sleeve, in addition to providing an insulating layer, may also impart to the cable advantageous mechanical and physical properties such as strength, abrasion resistance, and so on.

Whilst the exact specification of the end portion preparation vary from connector to connector, in general it is necessary to expose a length of the conducting core 110 at the end of the cable, then a length of the insulating first layer 111, then a length of the conducting second layer 112. The end portion preparation thus requires the removal of a relatively long length of the outer layer 113, the removal of a lesser length of the conducting second layer 112 and the removal of a relatively short length of the insulating first layer 111.

Step I of the method comprises making an annular cut 114 (for example with the tool of FIGS. 1 to 4, or with the tool of FIG. 6, described below) in a radial plane fully around the cable to a first depth sufficient partially to sever the first layer 111. The first cut may lie for example approximately 14 mm from the end of the cable and in the case of a typical electric co-axial cable, may penetrate the first layer 111 to a depth of approximately 50% of the radial thickness of that layer.

Step II of the method comprises rotating with a twisting motion, as shown by arrow A, the partially severed end portion of the cable, about the core 110. This has the effect of separating the first layer 111 completely, as shown at 115. In addition, in the case of a multi-stranded core 110, this action also has the advantageous effect of twisting together the strands of the core 110.

Step III is essentially the same as step I, in that an annular cut 116 is made fully around the cable in a radial plane, at a position further from the end of the cable than cut 114—and typically 22 mm from the end of the cable. Cut 116 is made to precisely the same depth as cut 114, and so penetrates the first layer 111 to the same extent as cut 114.

In step IV, an annular cut 117 is made fully around the cable in a radial plane further from the end of the cable than cuts 114 and 116, but to a lesser depth than those cuts. Typically, cut 117 is positioned 30 mm from the end of the cable, and penetrates only the outer third layer 113, to a depth of about 75% of the radial thickness of that layer.

Figure 1:
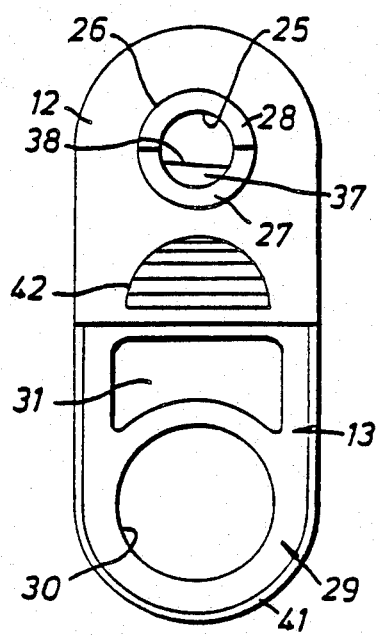
FIG. 1 is a front view of the cable stripping tool of this invention.

In the final step V of the end portion preparation, a force B is applied axially of the cable and in the direction of the end thereof to the severed third layer 113, the force being applied to that severed portion in the region of the third cut 117. This force advantageously is applied by way of the knife blade used to form the cut 117, though any of a variety of tools could be used for this purpose—for example, a pair of pliers or side cutters. This force slides all the severed portions off the cable end portion, so leaving exposed a length of core 110, a length of insulating first layer 111, and a length of conducting second layer 112, as shown in FIG. 1-IV.

It will be appreciated that it is an important feature of this invention that the depth of the first, second and third cuts 114, 116 and 117 are closely controlled and so the performance of this method does not readily lend itself to use by an operator using a free knife blade. However, a relatively simple tool or jig assembly for guiding the knife penetration can be designed to give the two depths of cut, so enabling satisfactory cable end portion preparation.

A further example of a tool suitable for performing the above-described method of this invention is illustrated in FIG. 6. This tool comprises a main body 120 defining a bore 121 of a suitable diameter closely to receive the cable to be prepared. The body 120 also defines a slot in which is slidably mounted a knife blade 122, for movement in a radial plane with respect to the bore 121. A control knob 123 is rotatably mounted on the body 120, the knob driving a cam (not shown) engaged with the knife blade 122 within the body 120, such that rotation of the knob 123 adjusts the amount by which the cutting edge of the knife blade 122 intersects the bore 121. An indexing arrangement advantageously is provided for the knob 123, such that the knob may be positioned and remain at a given setting.

Using a tool as described above permits the depth of cut of the blade 122 to be precisely controlled in a repeatable manner and so enables satisfactory performance of the method of this invention as described above, by positioning the cable to extend through the bore 121, turning the knob to give the required depth of cut, and then rotating the tool around the cable, so severing at least some of the cable layers.

In order to facilitate the positioning of the cuts at the correct position along the length of the cable, an indexing arrangement may be provided, projecting from the body 120 parallel to the axis of the bore 121, and against which the end face of the cable may be aligned each time a cut is to be made.

I claim:

1. A tool suitable for stripping distinct layers from a multi-layer elongate member, which tool comprises a body defining an opening in which may be received the member to be stripped, and a cutting blade pivotally mounted with respect to the body and movable between the two limiting positions in the first of which the cutting edge of the blade projects to a relatively large extent into the opening and in the second of which the cutting edge projects to a relatively lesser extent into the opening, whereby following the location of a multi-layer member in the opening and rotating the tool around the member in one sense, the blade is caused to move to one limiting position such that the cutting edge substantially severs several layers of the member, but on rotating the tool around the member in the other sense the cutting blade is caused automatically to move to its other limiting position such that the cutting edge severs fewer layers of the member.

2. A tool according to claim 1, wherein the cutting blade is pivotally mounted on a carrier which carrier is slidably mounted with respect to the body, whereby the blade may be moved clear of the opening by sliding movement of the carrier.

3. A tool according to claim 2, wherein a resilient bias is provided between the carrier and body, to urge the blade towards the opening.

4. A tool according to any of the preceding claims, wherein the opening is in the form of a through-bore, in which the cable may be received.

5. A tool according to any of the preceding claims, wherein the blade has a mounting hole by means of which the blade is pivoted to a pin provided on the tool body or carrier, if provided, and the blade has a second hole, preferably in the form of an elongate slot, through which a second pin passes with clearance, the pivoting movement of the blade about the first-mentioned pin being limited by interengagement of the edge of the blade defining the second hole with the second pin.

6. A tool according to any of the preceding claims and further comprising guide means adapted to assist the positioning of the tool with respect to a member, when a cut is to be made in the member, such guide means preferably comprising a projection from the tool body adjacent the opening therein and having graduations or other indexes for alignment with the member end or a cut already formed therein.

7. A tool according to claim 1, wherein the cutting blade is set relative to the axis of the opening in the body at a slight angle to a strict radial plane of the opening, whereby rotation of the tool around an elongate member may cause the body to be threaded along the member.

8. A tool according to claim 1, wherein the blade is pivoted directly to the body and is appropriately profiled to permit the application of a force thereto to drive the blade around the elongate member to be prepared.

9. A method for preparing the end portion of an elongate member having a core and at least three co-axial layers therearound so as successively to expose the core and layers from the end of the member, which method comprises:
 (a) effecting a first cut around the member at a position adjacent but spaced from the end of the member to a depth sufficient partially to sever the layer immediately overlying the core;
 (b) twisting the so-severed layers around the core so as to complete separation of the end portion of the layer immediately overlying the core from the major portion thereof;
 (c) effecting a second cut around the member at a position spaced further from the end of the member than the first cut and to the same depth as was effected the first cut;
 (d) effecting a third cut around the member at a position spaced further from the end of the member than the second cut but to a lesser depth sufficient at least partially to sever the third layer overlying the second layer but not to sever that second layer;
 (e) applying axially of the member and in the direction of the end thereof a force to the severed portion of the third layer at or immediately adjacent the third cut thereby to strip from the member successively from the third cut the third layer, the second layer and the first layer, so leaving an exposed length of the core at the end of the member.

10. A method according to claim 9, in which the portion severed by the first cut and separated on twisting the severed portion is immediately removed from the member, before effecting the second cut.

11. A method according to claim 9 or claim 10, and in which a single-bladed tool is used to effect the first, second and third cuts, the blade of the tool used to effect the third cut being left in the cut following the completion thereof, and an axial force towards the free end of the cable is applied to the tool so that the force is imparted to the severed layers through the blade of the tool.

* * * * *